United States Patent
Lemut et al.

(10) Patent No.: US 8,060,045 B2
(45) Date of Patent: Nov. 15, 2011

(54) METHOD FOR COMPENSATING THE NON-LINEAR DISTORTIONS OF HIGH-FREQUENCY SIGNALS AND DEVICE FOR CARRYING OUT SAID METHOD

(76) Inventors: Primoz Lemut, Tolmin (SI); Peter Paglovec, Cepovan (SI); Rok Ursic, Nova Gorica (SI); Andrej Kosicek, Nova Gorica (SI); Tomaz Karcnik, Ljubljiana (SI)

( * ) Notice: Subject to any disclaimer, the term of this patent is extended or adjusted under 35 U.S.C. 154(b) by 383 days.

(21) Appl. No.: 12/465,743

(22) Filed: May 14, 2009

(65) Prior Publication Data

US 2009/0295471 A1 Dec. 3, 2009

(30) Foreign Application Priority Data

May 27, 2008 (SI) .................................. P-200800136

(51) Int. Cl.
*H04B 1/06* (2006.01)
(52) U.S. Cl. ........................................ 455/259; 455/339

(58) Field of Classification Search .................... None
See application file for complete search history.

(56) References Cited

U.S. PATENT DOCUMENTS 7,295,826 B1 * 11/2007 Cook et al. .................... 455/323

OTHER PUBLICATIONS

Lawrence Doolittle (LBNL, Berkeley, California), Hengjie Ma, Mark Stuart Champion (ORNL, Oak Ridge, Tennessee), Digital Low-Level RF Control Using Non-IQ Sampling, LINAC 2006, 3 pages.

* cited by examiner

*Primary Examiner* — Lincoln Donovan
*Assistant Examiner* — Sibin Chen
(74) *Attorney, Agent, or Firm* — Beem Patent Law Firm

(57) ABSTRACT

The present invention refers to a method for compensating the non-linear distortions of high-frequency signals, especially when observing the amplitude modulated signals with narrow band receiver. The invention refers also to a device to carry out the said method. In the invention it is supposed that the ratio between the frequency $f_{IN}$ of the input signal $S_A$ and the sampling frequency $f_S$ that dictates the operation of the analogue-digital converter (3) is an arbitrary irrational number.

6 Claims, 1 Drawing Sheet

METHOD FOR COMPENSATING THE NON-LINEAR DISTORTIONS OF HIGH-FREQUENCY SIGNALS AND DEVICE FOR CARRYING OUT SAID METHOD

CROSS-REFERENCE TO RELATED APPLICATIONS

This application claims the benefit of priority from Slovenia patent application number SI P200800136, filed May 27, 2008.

BACKGROUND OF THE INVENTION

1. Field of the Invention

The present invention refers to a method for compensating the non-linear distortions of high-frequency signals, especially when observing the amplitude modulated signals with narrow band receiver. The invention refers also to a device for carrying out said method.

2. Description of the Related Art

A device known as digital radio has been long used in processing high-frequency signals. The latter divides the processed signal to two parts and mixes them with internally generated sine and cosine reference signal of the same frequency as the processed signals. The resulting signals are known as I and Q branches. Thus the information hidden in the carrier frequency is brought to the baseband by the square amplitude demodulation.

Sampling frequency at such way of processing signals is usually chosen to be an integer multiple of the frequency of the input signal. But this may cause problems because of the non-linearity of the analogue-digital converters and other electronic components. This non-linearity can be described as an additional amplitude modulation of the input signal, resulting in the higher harmonic signals appearing in the frequency band of interest and distorting the amplitude measurements of the observed signal. Additionally, the integer ratio between the sampling frequency and the input frequency means that the analogue-digital converter is operating in only N points and not in its entire operational range. Thus, the period of the additional modulation repeats after every N points.

The said problem was partially solved by L. Doolittle (L. Doolittle, H. Ma, Digital Low-Level RF Control Using Non-IQ Sampling, LINAC 2006) who proposed such sampling frequency change that the ratio between the latter and the frequency of the input signal is a rational number. Once chosen, the said ratio remains unchanged. In this case the higher harmonic frequency signals move away from the frequency of interest and the analogue-digital converter operates in more points but still not in its entire range. If the analogue-digital converter operates in more points this means that the frequency of repeating of the additional modulation diminishes. There are more higher harmonic components in the output signal but the power of a single component is lower (the overall power of the error always remains the same).

BRIEF SUMMARY OF THE INVENTION

It is the object of the present invention to create a new method for compensating non-linear distortions of high-frequency signals, in particular when observing the amplitude modulated signals with narrow band receiver, which will remedy the drawbacks of the known solutions.

Further object of the present invention is to provide a device for carrying out the compensation of the non-linear distortions of high-frequency signals, in particular when observing the amplitude modulated signals with narrow band receiver.

The method according to the invention enables observing the amplitude modulated signals and arbitrary selecting the ratio between the sampling frequency and the input signal frequency, which can be irrational. Thus, the analogue-digital converter operates in arbitrary many points, thus diminishing the power of the error at single frequency. The higher harmonic frequency signals move out of the frequency band of interest and do not distort the measurements. The observed signal has the carrier frequency, which is amplitude modulated with the signal of interest. Additionally, the observed signal can be amplitude modulated with arbitrary periodic disturbance.

BRIEF DESCRIPTION OF DRAWINGS

The invention is described in details hereinafter with references to the attached FIG. 1 showing, schematically, a device for carrying out the compensation of the non-linear distortions of high-frequency signals, especially when observing the amplitude modulated signals with narrow band receiver.

DETAILED DESCRIPTION OF THE INVENTION

Figure 1:
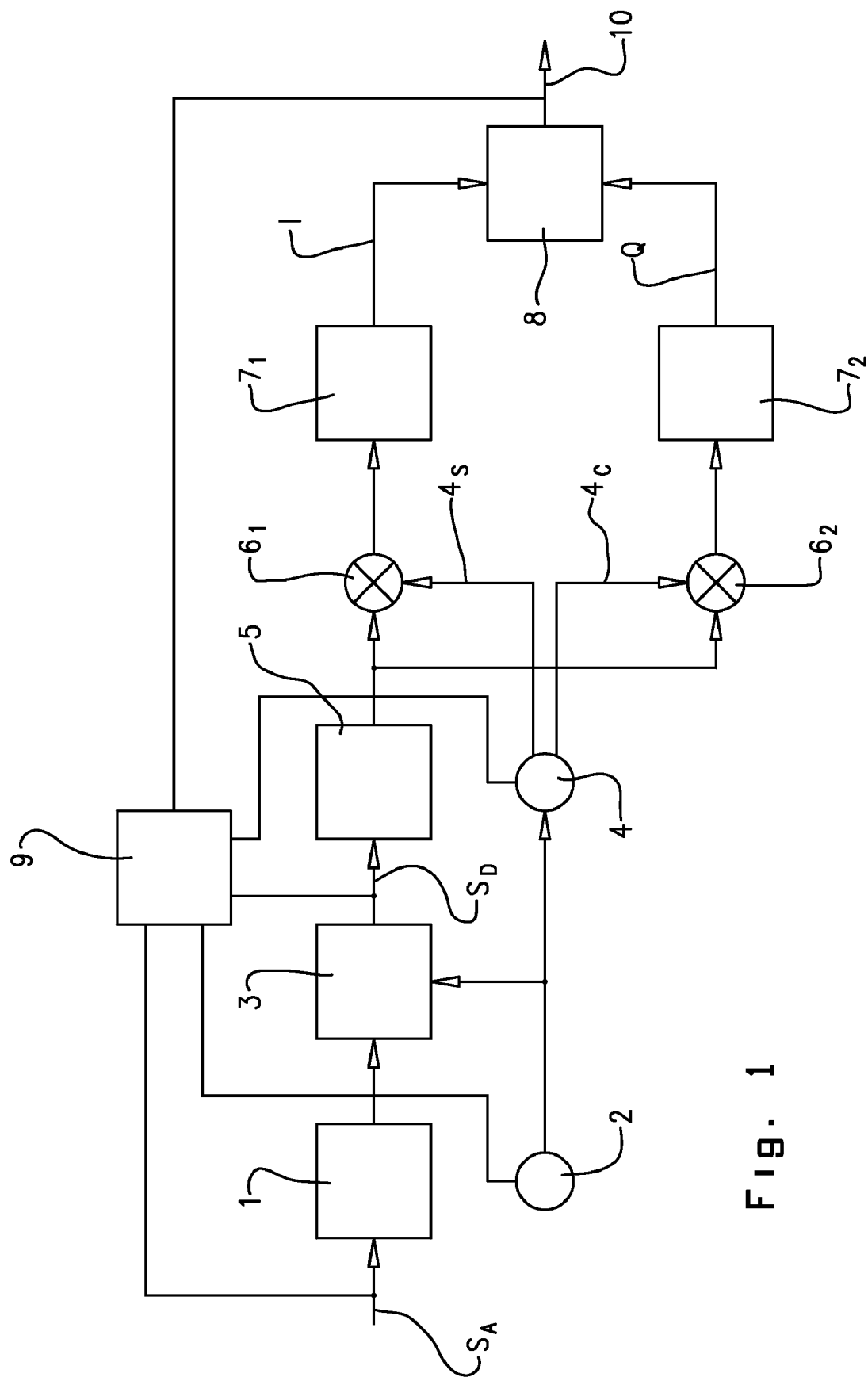

The observed modulated analogue signal $S_A$ is transmitted from the sensors (not shown in the figure) through a bandpass filter 1 that cuts off the signals with higher harmonic frequencies to an analogue-digital converter 3 (A/D converter). The A/D converter 3 operates at the sampling frequency $f_S$ which is being dictated by a reference oscillator 2. The latter determines also the frequency $f_{NCO}$ of a local oscillator 4 that generates two signals, namely a sine signal $4_S$ and a cosine signal $4_C$, both with frequency $f_{NCO}$, which is the same as the frequency $f_{IN}$ of the input signal $S_A$.

The observed digital signal $S_D$ coming from the A/D converter 3 is transmitted through a bandpass filter 5 which cuts off the higher harmonic components and intermodulation products that appear because of the non-linearity of the analogue electronic components. The signal coming out of the bandpass filter 5 is divided to two parts, the first part thereof is multiplied in mixer $6_1$ by the sine signal $4_S$ from the local oscillator 4, and the second part thereof is multiplied in mixer $6_2$ by the cosine signal $4_C$. The signals I and Q resulting from multiplying are transmitted to the low-pass filter that transfers only the signal in baseband and cuts off the part of the signal with double frequency. The amplitude of interest is calculated from signals I and Q in a demodulator 8 by means of square amplitude demodulation.

Because of non-linearity of electronic components the higher harmonic frequency signals and intermodulation products appear in digital signal after the A/D converter 3 besides of the signal of interest. Because of transference to the 1st Nyquist zone the overlapping of separate frequency components can happen. As the input signal $S_A$ can be amplitude modulated (disturbance) the side-bands appear next to the carrier signal, which are for an integer multiple of the modulation frequency away from it. The side-bands appear also next to all higher harmonic signals. It is those components that can overlap the signal of interest and distort the measurement of its amplitude.

Said problem can be solved by changing the frequency with which the A/D converter 3 samples the input signal $S_A$. By this means it is achieved that the higher harmonic components move away from the carrier signal and can be cut off by the bandpass filter 5. If the sampling frequency $f_S$ of the reference oscillator 2 is changed of course the local oscillator 4 frequency $f_{NCO}$ has to be changed, too, otherwise the result would not be in baseband.

At the beginning of operation the frequency of the reference oscillator 2 is set according to the estimation of the input analogue signal $S_A$. Through the entire method it is checked by a software module 9 whether an output digital signal 10 and/or the output digital signal $S_D$ of the A/D converter 3 and/or input analogue signal $S_A$ still contains disturbances inside the frequency bandwidth of the interest. If the disturbances are still present the module 9 calculates the sampling frequency $f_S$ and the frequency $f_{NCO}$ of the internally generated reference signal from the local oscillator 2 and sets them to new value. It is provided for according to the present invention that the ratio between the input signal frequency $S_A$ and the sampling frequency $f_S$ which dictates the operation of the A/D converter 3, is an arbitrary irrational number.

By changing the sampling frequency $f_S$ and the frequency $f_{NCO}$ of the internally generated reference signal from the local oscillator 2 it is achieved that the higher harmonic components which would otherwise distort the measurements, fall out of the frequency range of interest. At the same time the ratio between the sampling frequency $f_S$ and the input signal's frequency $f_{IN}$ can be arbitrary, meaning that the signal is sampled in many different points regarding its course and that the A/D converter 3 is uniformly loaded in its entire operational range.

While the foregoing written description of the invention enables one of ordinary skill to make and use what is considered presently to be the best mode thereof, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the claims.

The invention claimed is:

1. A method for compensating non-linear distortions of high-frequency signals, specifically when observing amplitude modulated signals with a narrow band receiver, comprising the following steps:
   a) estimating and setting a frequency of a reference oscillator according to an input analogue signal $S_A$;
   b) transmitting the analogue signal $S_A$, which is being processed, from sensors through a bandpass filter that cuts off signals with higher harmonic frequencies, to an analogue-digital converter;
   c) transmitting an output digital signal $S_D$ from the analogue-digital converter through the bandpass filter that cuts off higher harmonic components and intermodulation products appearing because of non-linearity of analogue electronic components;
   d) dividing the output signal from the bandpass filter to two signals, a first signal that is transmitted to a first mixer where it is multiplied by a sine signal from a local oscillator, and a second signal that is transmitted to a second mixer where it is multiplied by a cosine signal from the local oscillator;
   e) transmitting each of the first and second signals resulting from their multiplications to a low-pass filter that transfers only the signal in baseband and cuts off the part of the signal with double frequency;
   f) transmitting the first and second signals to a demodulator that calculates the amplitude of interest by means of square amplitude demodulation;
   g) checking whether at least one of the signals gained after step (f), the output signal of the analogue-digital converter, and the input analogue signal still contains disturbances inside an interesting frequency bandwidth;
   h) adjusting the frequencies of the reference oscillator and the local oscillator according to the results gained by step (g).

2. A method for compensating the non-linear distortions of high-frequency signals according to claim 1 wherein the analogue-digital converter operates with a sampling frequency which is dictated by the reference oscillator.

3. A method for compensating the non-linear distortions of high-frequency signals according to claim 1 wherein a reference generator dictates the frequency of the local oscillator which generates a sine signal and a cosine signal with frequencies the same as a frequency of the input signal $S_A$.

4. A method for compensating the non-linear distortions of high-frequency signals according to claim 3 wherein a ratio between the frequency of the input signal $S_A$ and the sampling frequency that dictates the operation of the analogue-digital converter is an arbitrary irrational number.

5. A device for carrying out the method according to claim 2 comprising:
   a) a bandpass filter (1) to which the input analogue signal ($S_A$) is transmitted;
   b) analogue-digital converter (3) to which the signal filtered in the bandpass filter (1) is transmitted;
   c) a bandpass filter (5) to which the output signal SD from the analogue-digital converter (3) is transmitted;
   d) mixers ($6_1$, $6_2$) where the output signal from the bandpass filter (5) is multiplied by the sine signal $4_S$ in the first of the mixers ($6_1$, $6_2$) and by the cosine signal $4_C$ in the second of the mixers ($6_1$, $6_2$);
   e) low-pass filters ($7_1$, $7_2$) to which output digital signals (I, Q) from the mixers ($6_1$, $6_2$) are transmitted;
   f) a demodulator (8) to which the output digital signals (I, Q) from the low-pass filters ($7_1$, $7_2$) are transmitted, and from which a digital signal (10) of interest comes out;
   g) an adjustable reference oscillator (2) which dictates the sampling frequency of the analogue-digital converter (3) and the frequency of the local oscillator (4) that generates the sine signal ($4_S$) and the cosine signal ($4_C$);
   h) a software module (9) which changes the frequency of the reference oscillator (2) according to at least one of the input analogue signal $S_A$, the output digital signal from the analogue-digital converter (3), and the output digital signal of interest (10) from demodulator (8).

6. A device for carrying out a method for compensating non-linear distortions of high-frequency signals, specifically when observing amplitude modulated signals with a narrow band receiver, the device comprising:
   a) a bandpass filter (1) to which an input analogue signal ($S_A$) is transmitted;
   b) analogue-digital converter (3) to which a signal filtered in the bandpass filter (1) is transmitted;
   c) a bandpass filter (5) to which an output signal SD from the analogue-digital converter (3) is transmitted;
   d) mixers ($6_1$, $6_2$) where an output signal from the bandpass filter (5) is multiplied by a sine signal $4_S$ in the first of a pair of mixers ($6_1$, $6_2$) and by a cosine signal $4_C$ in the second of the pair of mixers ($6_1$, $6_2$);
   e) low-pass filters ($7_1$, $7_2$) to which output digital signals (I, Q) from the mixers ($6_1$, $6_2$) are transmitted;
   f) a demodulator (8) to which the output digital signals (I, Q) from the low-pass filters ($7_1$, $7_2$) are transmitted, and from which a digital signal (10) of interest comes out;
   g) an adjustable reference oscillator (2) which dictates a sampling frequency of the analogue-digital converter (3)

and a frequency of a local oscillator (4) that generates the sine signal (4$_S$) and the cosine signal (4$_c$);

h) a software module (9) which changes a frequency of the reference oscillator (2) according to at least one of the input analogue signal SA, the output digital signal from the analogue-digital converter (3), and the output digital signal of interest (10) from the demodulator (8).

\* \* \* \* \*